United States Patent [19]

Michelotti

[11] 4,302,417
[45] Nov. 24, 1981

[54] SHAPING SHEETS OF HEAT-SOFTENABLE MATERIAL

[75] Inventor: Donald P. Michelotti, Pittsburgh, Pa.

[73] Assignee: PPG Industries, Inc., Pittsburgh, Pa.

[21] Appl. No.: 152,280

[22] Filed: May 22, 1980

[51] Int. Cl.³ .................. C03B 21/02; C03B 23/023; C03B 23/025; B29C 17/02

[52] U.S. Cl. .................... 264/322; 65/105; 65/106; 65/289; 264/339; 425/383

[58] Field of Search .............. 264/320, 322, 339; 65/287, 289, 291, 90, 273, 275, 281, 282, 286, 105-107; 425/383, 403

[56] References Cited

U.S. PATENT DOCUMENTS

| | | | |
|---|---|---|---|
| 760,959 | 5/1904 | Connington | 65/290 |
| 2,021,180 | 11/1935 | Galley | 65/287 |
| 2,111,392 | 3/1938 | Galley | 65/287 |
| 2,123,552 | 7/1938 | Helwig . | |
| 2,218,654 | 10/1940 | Paddock . | |
| 2,377,849 | 6/1945 | Binkert et al. . | |
| 2,420,119 | 5/1947 | Boehm et al. . | |
| 2,442,338 | 6/1948 | Borkland | 65/287 |
| 2,474,652 | 6/1949 | Block . | |
| 2,510,304 | 6/1950 | Ames . | |
| 2,518,896 | 8/1950 | Jendrisak . | |
| 3,020,596 | 2/1962 | Clapp et al. . | |
| 3,574,807 | 4/1971 | Heavener . | |
| 3,600,150 | 8/1971 | Rougeux | 65/287 |
| 3,607,188 | 9/1971 | Stilley et al. | 65/106 |
| 4,002,417 | 1/1977 | Vecchiotti et al. | 425/385 |

OTHER PUBLICATIONS

SN 18,964, Comperatore et al.
SN 25,137, Comperatore et al.

*Primary Examiner*—Willard E. Hoag
*Attorney, Agent, or Firm*—Edward I. Mates

[57] ABSTRACT

Shaping sheets of heat-softenable material while suspended from cable means.

50 Claims, 10 Drawing Figures

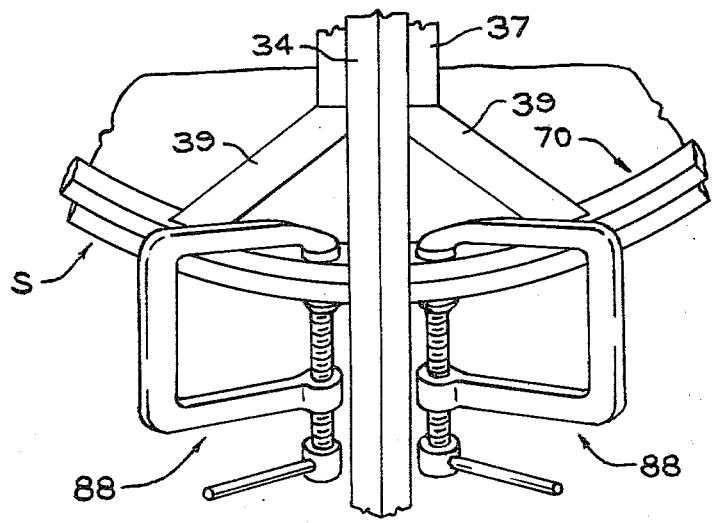
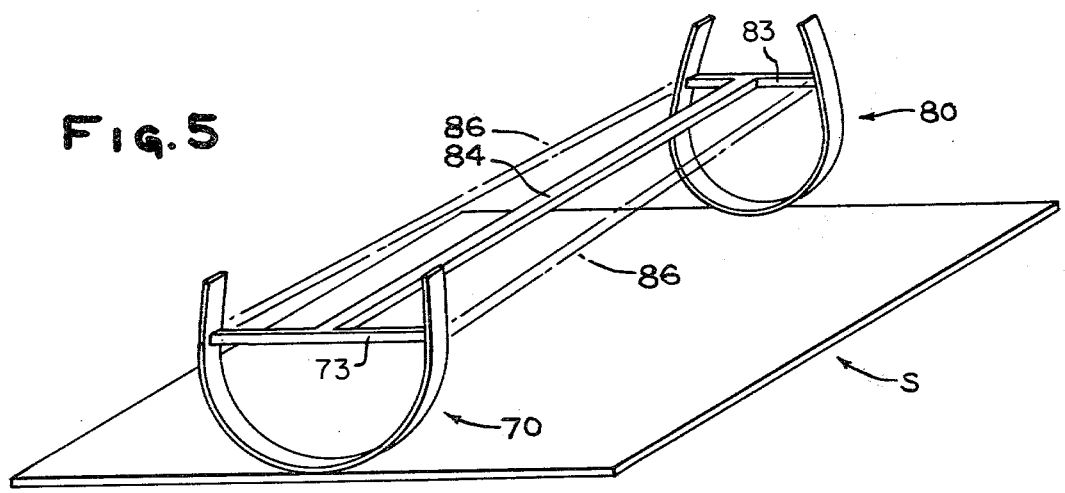
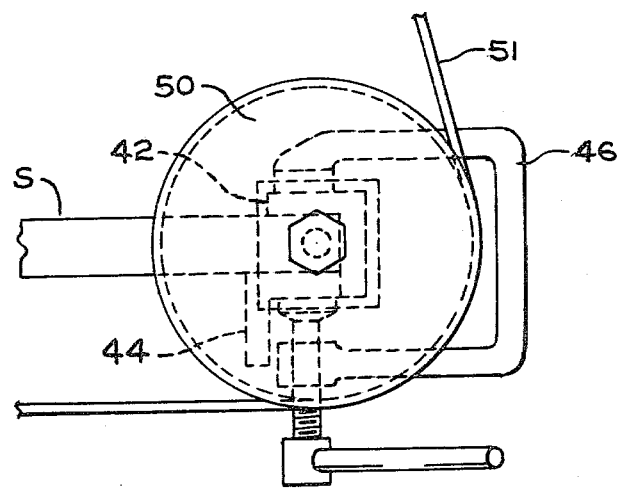

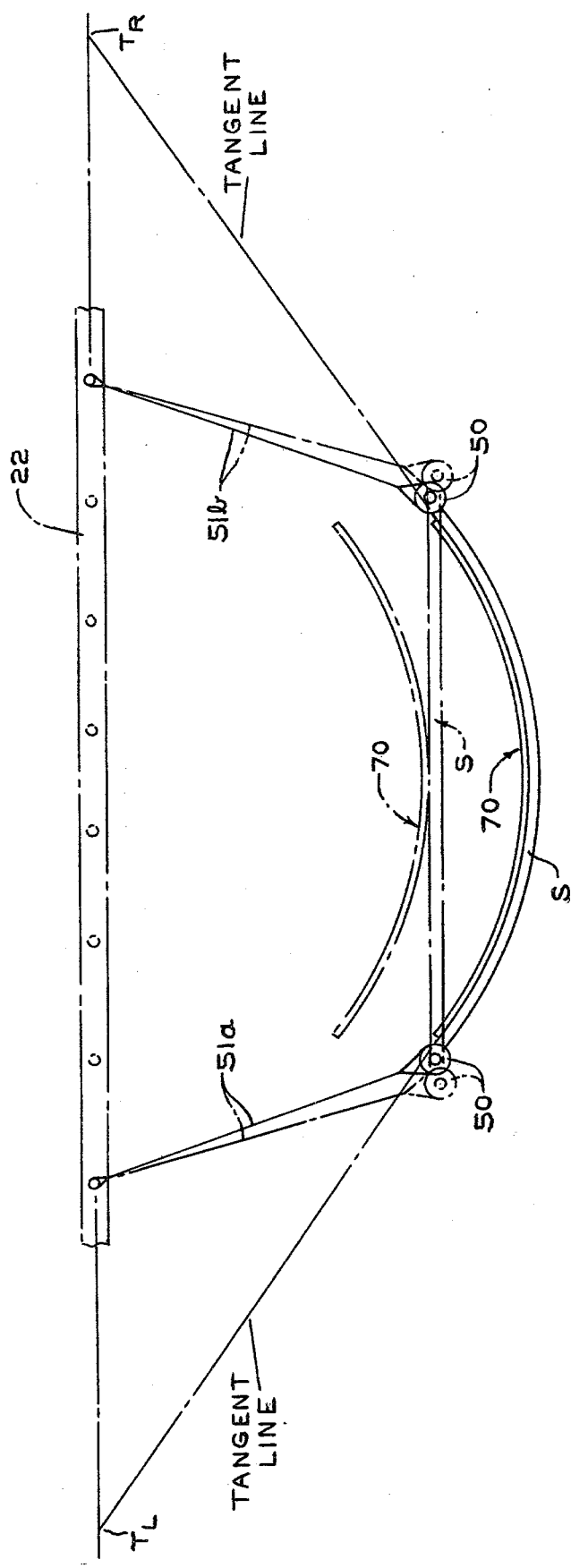

SHAPING SHEETS OF HEAT-SOFTENABLE MATERIAL

BACKGROUND OF THE INVENTION

1. Field of the Invention

This invention relates to the shaping of heat-softenable materials such as glass and plastic materials that are used as substitutes for glass in aircraft transparencies where light weight is an important factor in addition to good optical properties. Typical organic compositions include acrylic plastics, polycarbonates, polyester resins and certain polyurethanes.

Aircraft transparencies include both windows and closings for pilot cockpits. The latter are generally in the form of a complicated bubble whose cross-section at different portions along its length defines arcs of different curvature and whose curve extends transversely around more than 180 degrees of arc of a circle, ellipse or other rounded shape. In addition, the longitudinal dimension of the bubble is curved about an axis extending transverse to its length. Such shapes are needed in aircraft so that the contour of the transparencies follows the shape of the aircraft fuselage in order to make the aircraft as streamlined as possible. In addition, it is necessary that a pilot sitting in the cockpit have good visibility through the cockpit transparency so as to have a good view in all directions from the aircraft.

When glass or lightweight plastic sheets having the requisite transparency are shaped by pressing them against solid molds having the desired curvature and configuration, the major surfaces of the sheets that ultimately form the transparency are likely to become marked. When sheets are formed by sagging due to gravity to conform to the shape of an outline mold, it is difficult to maintain the shape of the glass within the outline that conforms to the outline mold. Other means of forming glass or plastic sheets while heat-softened, such as blow forming and vacuum forming, have their limitations in the complexity to which the sheets can be shaped.

During blow forming, the thickness of the glass sheet that results from such shaping is non-uniform and the degree of non-uniformity varies considerably with the size of the sheet and the degree of curvature to which the sheet is to be shaped.

At the time of the present invention, the sheet shaping art required a technique for shaping sheets of glass or transparent plastic materials to complicated shapes needed for various aircraft transparencies in such a manner that the sheets would avoid problems due to inadequate shaping and/or the marking of the major surfaces and/or the development of non-uniform thickness during the shaping operation.

Some of the recent shapes required involve the F-16 aircraft canopy and also transparencies for the F-15 aircraft. One of the complicated parts that the present invention can produce has a complicated shape that includes a semi-cylindrical shape at one end and a bend of varying radius extending well over 180 degrees of arc around the circumference of a rounded shape at the other end. The patents available in the prior art were not capable of producing such complicated bends without introducing optical deficiencies and/or causing non-uniform thickness in the workpiece.

2. Description of Patents of Interest

U.S. Pat. No. 2,123,552 to Helwig discloses the blow forming of plastic sheeting against a so-called negative mold having a three dimensional curved surface allegedly without marring the surface of the sheet undergoing shaping. The plastic sheet is blow formed against a mold having a convex shaping surface by the application of fluid pressure. When the fluid pressure exceeds a predetermined amount, which is associated with the completion of the shaping, the pressure lifts the mold. This actuates a solenoid valve circuit which stops the application of pressure so as to produce a shaped plastic sheet that does not come into contact with the mold shaping surface and which, as a consequence, has optically clear surfaces.

U.S. Pat. No. 2,218,654 to Paddock discloses a two-step method for shaping glass sheets to deep bends. The first step is an over bend where the glass, while supported on pipes between its ends and on additional pipes at its ends is heated to a glass softening temperature. The end supporting pipes are removed to permit the glass sheet to sag into a convexly elevated shape. The glass sheet is then turned upside-down and shaped additionally by gravity sagging through the application of heat while the upside-down glass sheet is supported over a gravity bending mold having a shaping surface of concave elevation.

U.S. Pat. No. 2,377,849 to Binkert and Jendrisak discloses a process of bending a stack of glass sheets by prebending them by gravity to conform to the shape of a first mold followed by shaping the glass sheets by a combination of gravity and suction to conform to a second mold of compound curvature.

U.S. Pat. No. 2,420,119 to Boehm and Ladon discloses a method of shaping sheet material by applying rollers over one surface of a sheet that is rolled to conform to the outer shape of a male mold. The rollers are not capable of providing the optical quality needed for aircraft transparencies, because they roll against the vision area of the sheet during shaping.

U.S. Pat. No. 2,474,652 to Block discloses a method that uses a hinged bending mold to form a sheet comprising composite laminated structures of metal and wood. The final shape of the contour is defined only by a clamping rail and a center hold down member. Since the center hold down member forming part of the apparatus of this patent engages the entire length of the composite to be shaped, a composite composed of a transparent material would have a line of optical defect extending across the center of the fabricated article.

U.S. Pat. No. 2,510,304 to Ames relates to centrifugally forming canopies. This technique is entirely different from the technique of the present invention and would result in optical defects when the canopy contacts the mold.

U.S. Pat. No. 2,518,896 to Jendrisak discloses a technique of bending a pair of glass sheets supported in an oblique orientation over an outline shaping mold. A pivotable frame member of complemental shape rests on the upper shaping surface of the glass sheet when the latter is heat-softened to pressure form the glass to a shape conforming to that of the upwardly facing outline shaping surface of the mold beneath the glass sheet.

U.S. Pat. No. 3,020,596 to Clapp and Jameson forms a heat softened sheet to a cylindrical shape by draping it over a male mold of convex elevation. Since gravity is the only force and depends on the weight of the plastic sheet, it is quite possible that gravity alone will be insufficient to pull the weight of the heat softened sheet to the exact configuration of the male mold. Such a technique cannot produce any complicated shape that includes a reverse sag and cannot form parts that are shaped to a contour that extends more than 180 degrees of arc around a circumference.

U.S. Pat. No. 3,574,807 to Heavener discloses a method of molding plastic sheets to a V-type bend using an angulated cavity form as a bending mold. A pair of metal bars are used to provide rigidity in the direction perpendicular to the bending axis in order to ensure that the sheet to be shaped bends about a single axis.

U.S. Pat. No. 3,607,188 to Stilley and Eilenfeld covers a method and apparatus for shaping a glass sheet to a hemispherical shape by first applying a plunger to the upper surface of the heated glass sheet while the latter is spaced above a mold to accelerate the initial sagging of the sheet. The downward movement of the plunger is limited so that the sheet sags away from the plunger and toward the mold. This patent minimizes surface damage by avoiding simultaneous engagement of both major surfaces of the sheet to be shaped in its viewing area. However, this patented apparatus does not teach one skilled in the art how to bend a sheet to a shape having a cross-section of arcuate shape extending more than 180 degrees.

U.S. Pat. No. 4,002,417 to Vecchiotti and Goldberg discloses apparatus for folding a sheet of plastic material along a fold line using a mechanical linkage mechanism. This patent is incapable of producing complicated shapes presently required in aircraft transparencies.

U.S. patent application Ser. No. 18,964 of Comperatore, Wise, and Black, filed Mar. 9, 1979, now U.S. Pat. No. 4,233,050 covers shaping glass sheets to complicated shape by first preliminarily shaping said sheets to a prebent shape within a thin flexible blanket of fiber glass cloth and converting the prebent shape to a final complicated shape during final shaping by blow forming. This application also covers a technique of cradling glass sheets in a flexible fiber glass blanket that is wrapped over the margin of the glass sheet to be shaped by blow forming. The margin of the blanket is reversely wrapped over a frame-like ring that prevents the marginal edge from curling and maintains the cradle in tension against the lower major surface of the glass sheet during final shaping by blow forming.

U.S. patent application Ser. No. 25,137 of Comperatore, Black and Wise, filed Mar. 29, 1979, now U.S. Pat. No. 4,229,201 covers apparatus for shaping a glass sheet to a complicated shape including a pair of sharply bent areas extending across its transverse dimension and a substantially spherically sagged portion intermediate the areas of sharp bending by a combination of gravity sag bending and localized intense line heating.

SUMMARY OF THE INVENTION

The present invention of forming heat-softened sheets is applicable to forming many shapes including those having a compound bend. It can also be used as one of the steps of a multiple step shaping process to form parts with a compound bend. The forming method of the present invention can be used to shape sheets of glass and/or transparent plastic materials used for aircraft transparencies into cylindrical parts, conical parts and parts having varying radii.

The present invention comprises a cable suspension system which supports a sheet to be formed above the floor. This suspension system comprises two or more cable means and uses gravitational forces to form the sheet to the desired shape. Mechanical force may supplement the gravitational forces, if desired.

The sheet to be shaped is clamped with a pair of elongated clamps that comprise a pair of elongated clamping members sandwiching the opposite side edges of the sheet. The clamps are suspended by cable means. The clamping members (shown as essentially straight angle irons in the illustrative embodiment) stiffen the sheet so that the sheet cannot buckle or bend away from its initial longitudinal shape about an axis perpendicular to the length of the angle irons. The clamping members may also be curved longitudinally to conform to the longitudinal shape of the sheet to be bent.

A shaping member is clamped to each end portion of the sheet to be shaped. These shaping members define the desired final shape of the sheet at its longitudinal end portions after the shaping operation is completed.

If it is desired to bend the sheet at one end only, only one shaping member is provided to engage one end to be shaped and the opposite end portion of the sheet to be kept straight is clamped to a flat member that retains the original flat shape of the sheet at the opposite end. When the sheet is to be shaped to a configuration having different shapes at opposite ends, the shaping members engaging the opposite longitudinal ends have different configurations.

In one embodiment of this invention, a pulley is rotatedly supported at each end of each of the elongated clamps that reinforce the opposite side edges of the sheet to be bent. The pulleys are arranged to provide a pair of spaced pulleys associated with each of the opposite end portions of the sheet.

A cable is entrained about one of the pairs of pulleys associated with one end portion of the sheet, and another cable is entrained about the other pair of pulleys associated with the other end portion of the sheet. The pulleys in each pair move toward one another as the sheet sags to shape.

In an alternate embodiment of this invention, two pairs of cables are suspended at their upper ends from fixed, transversely spaced, overhead supports and connected at their lower ends to the opposite corner portions of each end portion of the sheet to be shaped. The lower connections of each pair move toward one another as the sheet is shaped in this embodiment as in the first embodiment.

The cable means of both embodiments are suspended in such a manner as to provide force to pull the opposite end portions of the sheet into contact with the respective shaping members aligned with said end portions. The portion of the sheet intermediate said end portions develops a shape that conforms to or merges between the shapes developed by the shaping members at the opposite end portions of the sheet to be shaped. The elongated clamps may be suspended by cable means attached to the ends of the clamps or elsewhere along their lengths.

The weight of the shaping members resting on the end portions of the sheet suspended by said cable means acts downward on the sheet. As the sheet becomes softened by the application of heat, the weight of the metal shaping member or members tends to wrap the end portion or end portions of the heat-softened sheet therearound. Once the sheet is heated to its softening temperature, the softened sheet end portions readily conform to the surface of the shaping members as gravity pulls the shaping members downward. If the shape desired is sufficiently complicated, mechanical force may be applied to the shaping members to augment the force of gravity.

In a particular embodiment of the present invention, the sheet shaping members are connected to one another to form a sheet shaping frame. In addition, the cables of this embodiment are attached at one of their ends to a frame-like carriage which supports the cables, the pulleys, the sheet to be shaped and its clamps, and the shaping members for movement into and out of a furnace for heat-softening the sheet to be shaped. In addition, means is provided in the preferred embodiment to clamp each of the shaping members to the sheet and further means is provided to guide the last named means for vertical movement and avoid oblique movement of the suspended sheet in response to its heat sagging. Cranks may be included in this embodiment for raising or lowering the level of support for the sheet to be shaped.

The benefits of the present invention will be understood better in the light of a description of the specific embodiments that follows.

BRIEF DESCRIPTION OF THE DRAWINGS

In the drawings that form part of a description of the present embodiment,

FIG. 3 is a fragmentary end view of a portion of a sheet showing how it is clamped between a pair of clamping members and suspended by a pulley.

FIG. 4 is a fragmentary end view showing how clamp means cooperates with a front vertical guide post to guide the sagging movement of a sheet in a vertical direction during its shaping;

FIG. 5 is a perspective view of an alternate embodiment of a shaping frame shown resting on a flat sheet to be shaped, with clamps and vertical guides omitted to show other parts more clearly.

FIG. 10 is a sketch depicting how the embodiment of FIG. 8 may be used to produce a shallow curve, with the initial arrangement shown in phantom and the final arrangement in full lines, and also showing in phantom tangent lines defining the outermost points of suspension permissible to develop such bends.

DESCRIPTION OF A PREFERRRED EMBODIMENT AND MODIFICATIONS THEREOF

Figure 1:
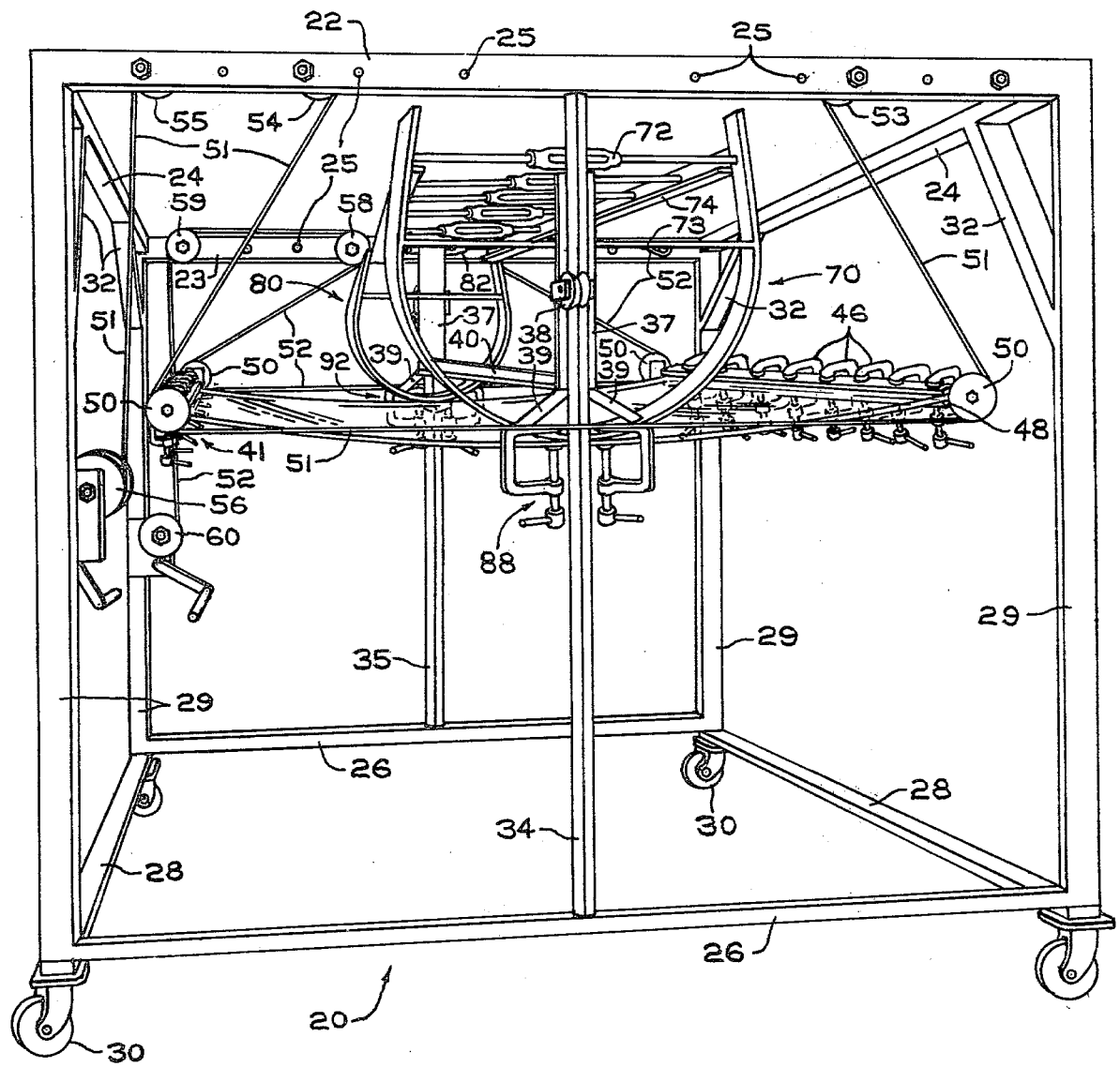
FIG. 1 is a perspective view looking at an end of apparatus for performing the present invention when a sheet to be formed is first loaded on the apparatus for shaping.

Referring to the drawings, apparatus conforming to the present invention is supported on a carriage 20. The latter comprises an upper front cross member 22 and an upper rear cross member 23. A pair of upper longitudinal members 24 interconnect the respective ends of the upper front cross member 22 and the corresponding ends of the upper rear cross member 23 to form an upper horizontal frame. Each of the upper cross members is provided with a series of apertures 25.

The carriage also comprises a pair of lower cross members 26 and a pair of lower longitudinal members 28 interconnected to form a lower horizontal frame maintained in spaced relation below the upper horizontal frame that is formed by the upper front cross member 22, upper rear cross member 23, and the upper longitudinal members 24. Four vertically extending corner posts 29 interconnect the ends of the respective upper members and the lower members at the corners formed by the upper horizontal frame and the lower horizontal frame to form an open box.

Casters 30 are fixed to the bottom ends of each of the corner posts 29 to enable the carriage 20 to be moved into and out of a furnace (not shown). The carriage is also provided with oblique braces 32 for structural rigidity.

In addition, a pair of readily removable vertical guide posts including a front post 34 and a rear post 35 is provided. The front vertical guide post 34 interconnects the center of the upper front cross member 22 and the center of one of the lower cross members 26 directly therebeneath. The rear vertical guide post 35 interconnects the center of the upper rear cross member 23 with the center of the other lower cross member 26 so that the guide posts 34 and 35 extend vertically in a vertical plane that intersects the longitudinal dimension of the carriage 20. A bracket 37 is provided with a free running wheel 38 to engage the front vertical guide post 34. A similar structure is provided to engage the rear vertical guide post 35. The brackets 37 extend downward into bifurcated extensions 39, the purpose of which will be described later. A bracket connector 40 interconnects the brackets 37 to one another.

The apparatus also comprises a pair of clamps 41. Each of the clamps 41 comprises an upper clamping member 42 in the form of an elongated unitary angle iron and a lower clamping member 44 in the form of another elongated unitary angle iron. Both of the angle irons 42 and 44 extend the full length of a sheet of material to be shaped and are clamped against its upper and lower surfaces along the opposite longitudinal side edges of the sheet to be shaped by a series of closely spaced C-clamps 46.

Figure 2:
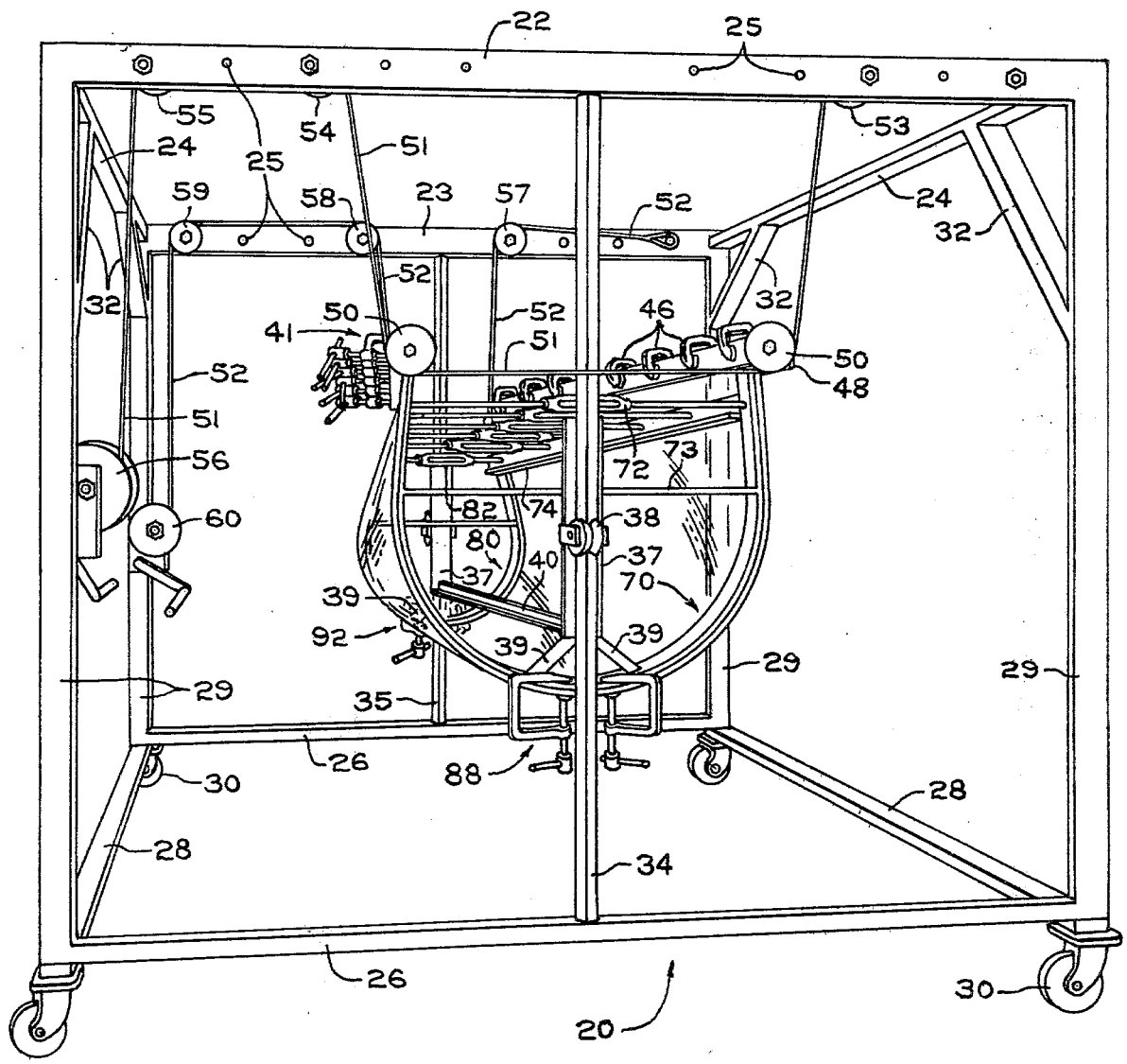
FIG. 2 is a view similar to FIG. 1 showing the arrangement of the apparatus elements after the sheet has been shaped.

A bracket 48 is attached to one or the other of the clamping members 42 or 44 at each end of the clamp 41 to support a pulley 50. The front pair of pulleys 50, as seen in the front of FIGS. 1 and 2, are used to entrain therearound a front cable 51, whereas the rear pulleys 50 at the rear ends of the clamps 41 are used for entraining a rear cable 52.

The front cable 51 has an end attached to a pin extending through a selected aperture 25 of the upper front cross member 22 and then entrains over a right front upper pulley 53, then under the front pulleys 50, then upward to entrain over a left front upper pulley 54 and then around a left front end pulley 55. The pulleys are supported in selected positions corresponding to selected apertures 25 along the upper front cross member 22. Cable 51 continues to a connection at its other end to a front crank 56. The latter is supported on a bracket fixed to one of the front corner posts 29.

The rear cable 52 is attached at one end to a pin extending through a selected aperture 25 along the upper rear cross member 23. Rear cable 52 extends from its point of attachment to entrain over a right rear upper pulley 57 rotatably supported on the upper rear cross member 23 at a preselected position corresponding to one of its apertures 25. The rear cable 52 continues downward where it is entrained under the rear pair of pulleys 50 attached to the rear ends of the clamps 41 and then extends upward to where it is entrained over a left rear upper pulley 58 and a left end rear upper pulley 59 to a connection to a rear crank 60. The latter is mounted on a bracket fixed to one of the rear corner posts 29.

The apparatus of the present invention further comprises at least one shaping member 70. The shaping member 70 may be the only shaping member having a shape or may be the front shaping member of a pair of shaping members. In the embodiment illustrated in FIGS. 1 and 2, in order to bend sheets to a shape wherein their leading edge portion and their trailing edge portion, as seen in the drawings, have different configurations, the front shaping member 70 is of substantially U-shape or ring-like configuration and has its upwardly extending portions interconnected by a turnbuckle 72 as may be needed to adjust its shape, and by a cross bar 73 to improve the rigidity of the front shaping member 70. The front shaping member 70 is connected to the front bracket 37 by suitable connections to its bifurcated extensions 39.

The apparatus is also provided with a rear shaping member 80 having a generally U-shape that may differ from that of the front shaping member 70. However, should the apparatus be designed for shaping the glass to a cylindrical shape or one wherein the shapes or configurations at the leading and trailing edge portions are identical, then shaping members 70 and 80 would be identical. A turnbuckle 82 similar to turnbuckle 72 is provided to adjust the shape of the rear shaping member 80. If needed, a cross bar similar to cross bar 73 may be provided.

A pair of side bars 74 interconnect the front shaping members 70 and the rear shaping member 80. These side bars 74 are interconnected by additional turnbuckles 72.

In an alternate embodiment shown in FIG. 5, the shaping members 70 and 80 are provided with cross bars 73 and 83, respectively. The latter are interconnected by a connecting bar 84. If needed, additional side bars 86 (depicted in phantom) may be added to further interconnect the front shaping member 70 and the rear shaping member 80 to provide a more rigid and less deformable shaping frame than the embodiment of FIGS. 1 and 2. In fact, the FIG. 5 embodiment omits the bracket connector 40 of the first embodiment in favor of connecting bar 84.

A pair of front clamps 88 clamps the transverse center portion of the front shaping member 70 to the transverse center portion of the sheet S to be shaped at one end thereof. Similarly, a pair of rear clamps 92 clamps the transverse central portion of the rear shaping member 80 to the transverse center portion of the sheet S at its other longitudinal end.

OPERATION OF SPECIFIC EMBODIMENTS

When a sheet is to be shaped, an oversized blank is clamped by clamps 41 along both of its opposite longitudinal side edges as depicted in FIG. 1 and the front and rear cables 51 and 52, respectively, are mounted as shown. The clamped sheet S is thus suspended or cradled within the carriage 20. The front and rear clamps 88 and 92 are applied to connect the center of the front shaping member 70 and of the rear shaping member 80 to the opposite ends of the sheet S at the end portions of its longitudinal center line. The carriage 20 is then inserted within a furnace to heat the sheet for sufficient time to develop a heat-softening temperature within the sheet.

The temperature needed to soften the sheet to be shaped depends upon its composition and its thickness. However, different materials soften at different temperatures. For example, glass sheets soften at temperatures above about 1000° F. (540° C.) to about 1200° F. (650° C.), but should not be heated above about 1500° F. (815° C.) to avoid devitrification; cast acrylic sheets soften at about 200° F. (93° C.) and should not be heated above about 225° F. (107° C.) to avoid discoloration; stretched acrylic sheets soften at about 200° F. (93° C.) but must be maintained below about 225° F. (107° C.) to avoid spring back; and polycarbonate sheets soften above 275° F. (135° C.) but should not be heated above about 360° F. (182° C.) to avoid discoloration. The duration of the time the sheet spends at elevated temperatures is a factor in determining how much a sheet sags.

Gravity causes the shaping members 70 and 80 to move downwardly against the upper surface of the sheet to be shaped as the sheet softens, thereby imposing their shapes on the longitudinal front and rear ends of the sheet. The intermediate portion of the heat-softened sheet follows the shapes imparted to the front and rear end portions of the sheet. The clamps 41 follow the clamped longitudinal side portions of the sheet as the sheet end portions are wrapped against the undersurfaces of the shaping members 70 and 80.

When the sheet conforms to the shape desired at both its leading and trailing edges, it is removed from the furnace and any excess material clamped between the clamps 41 can be trimmed from the blank to develop the outline form of the sheet. The front and rear cranks 56 and 60 may be used to force the sheet against the lower surface of the shaping members 70 and 80 to develop a shape conforming more exactly to that desired. The cranks 56 and 60 may be rotated by hand or may be driven by a motor.

Figure 6:
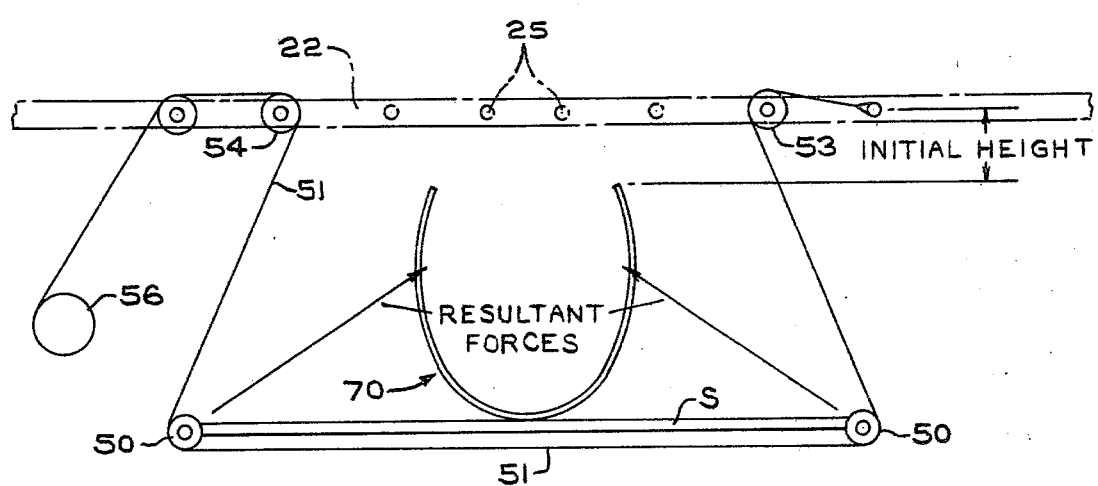
FIG. 6 is a schematic illustration depicting how a single, flexible cable applies resultant forces to a pair of corresponding ends of a pair of clamps attached to the opposite longitudinal side edges of a sheet clamped at one end to a shaping member at the beginning of a bending cycle.
Figure 7:
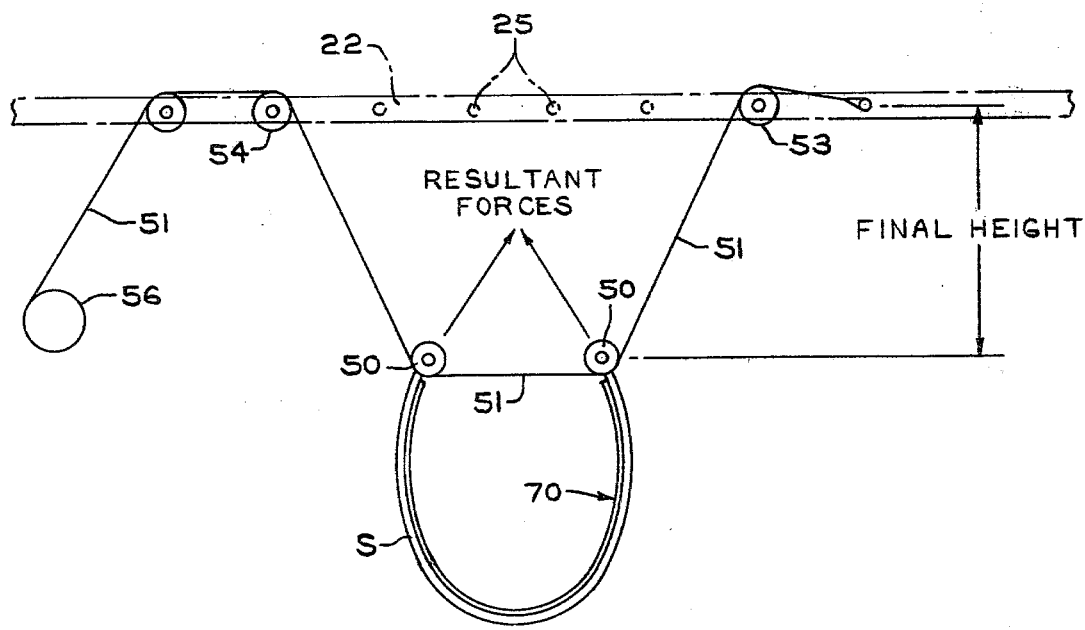
FIG. 7 is a view similar to that of FIG. 6, showing how the flexible cable applies resultant forces to said one end of said pair of clamps at the end of the bending cycle whose start is depicted in FIG. 6.

FIGS. 6 and 7 help explain diagrammatically how cable 51 provides resultant forces that cooperate with the downward force of gravity provided by the front shaping member 70 to wrap the front end of the sheets to be shaped around the downwardly facing shaping surface of the shaping member 70. Only the front end of the apparatus is shown for the sake of simplicity. It is understood that cable 52 cooperates with rear shaping member 80 to wrap the rear end of the sheet in a similar manner against the rear shaping member and that the details described for the operation of cable 51 and front shaping member 70 apply similarly to that of cable 52 and the rear shaping member 80.

A comparison of FIGS. 6 and 7 shows that initially the front shaping member 70 is supported by the clamped sheet a short distance below the plane of support provided by the upper front cross member 22 on which pulleys 53, 54 and 55 are supported. Cable 51 applies a pair of oblique resultant lifting forces through the front pulleys 50 against the opposite side edges of the sheet to be shaped. As the sheet is softened, it yields to these resultant forces applied initially in the direction of the arrows of FIG. 6. The transverse center portion of the sheet clamped to the front shaping member 70 sags downward as the sheet softens by the application of heat. The front shaping member 70 follows the sheet S downward as the latter sags. As the sheet S wraps around the front shaping member 70, the direction of the resultant forces on the side edges of the sheet change to some extent, depending on the configuration of the shaping surface of the shaping member 70. However, as long as the resultant forces have a component of force that is directed transversely inward of the tangents at the upper ends of the shaping member, the front end of the sheet will be forced against the front shaping member 70.

A similar shaping operation takes place simultaneously at the rear end of the sheet S against the rear shaping member 80. The portion of the sheet S intermediate its front end and its rear end follows the shaping imparted to the ends of the sheet. If both ends are shaped to identical configurations, the sheet will be shaped to an essentially uniform cross-sectional configuration along its length. If the sheet is shaped to different configurations at its front and rear ends, the portion of the sheet intermediate its ends will merge from one configuration at its front end to the other configuration at its rear end.

Figure 8:
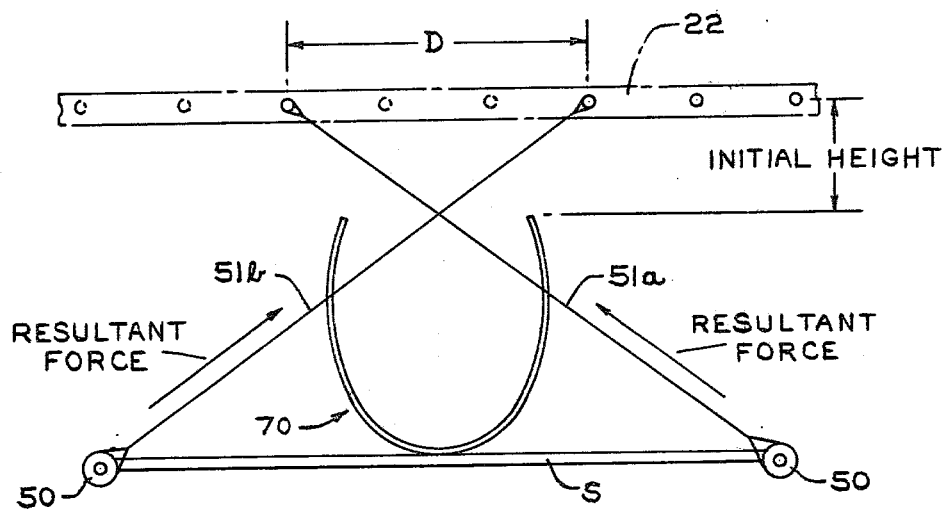
FIG. 8 is a view similar to that of FIG. 6, showing how individual flexible cables are arranged in an alternate embodiment to apply resultant forces to the corresponding ends at the initial phase of a bending cycle.
Figure 9:
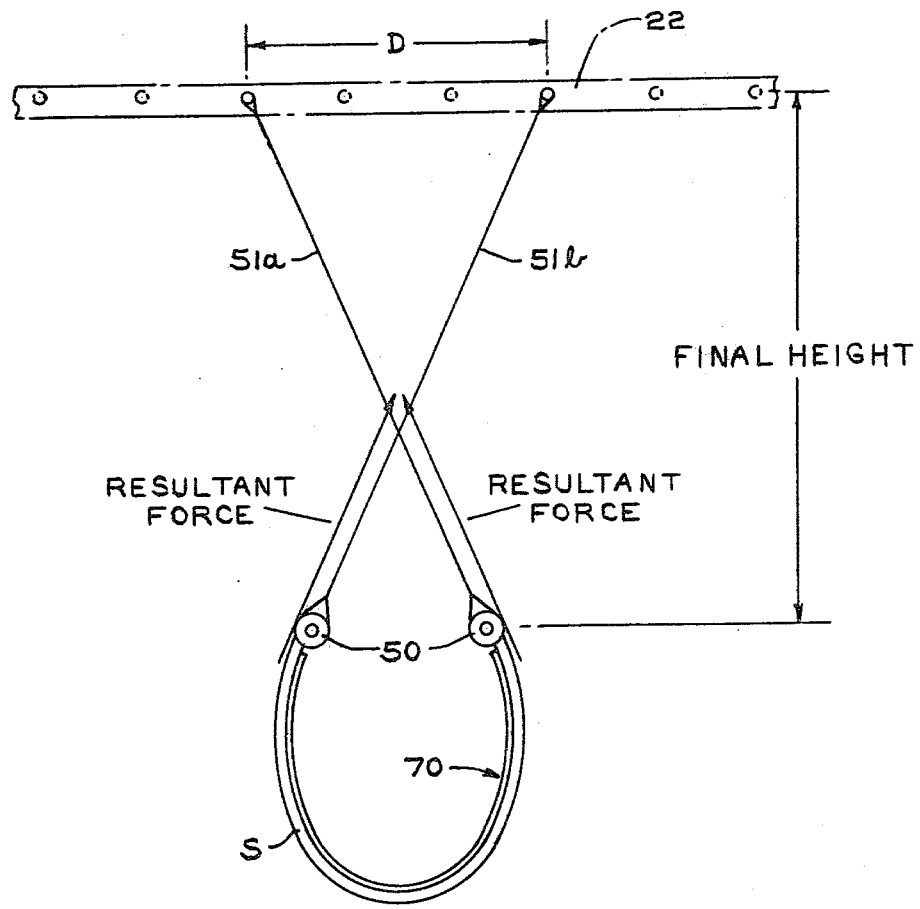
FIG. 9 is a view similar to that of FIG. 7, showing how the resultant forces are applied at the end of the bending cycle employing the embodiment of FIG. 8.

An alternative method of developing the results produced in FIGS. 6 and 7 is illustrated in FIGS. 8 and 9. In this embodiment, a pair of front cables 51a and 51b are provided in diagonally suspended orientation from the upper front cross member 22 to the front pulleys 50, and are offset from each other relative to the longitudinal dimension of the sheet S to provide clearance between cables 51a and 51b. A similar pair of cables is provided for the rear shaping member (not shown). In this embodiment, the resultant forces that tend to wrap the front end of the heat-softened sheet S about the front shaping member 70 (and, likewise the rear end of the sheet about the rear shaping member 80), are directed along the length of the front cables 51a and 51b (and corresponding rear cables). In this embodiment, the shaping members lower as the sheet changes shape from its initial flat to its ultimate curved configuration. The curved configuration encompasses more than 180 degrees of arc when the points of suspension for the cables 51a and 51b (and the corresponding rear cables) are spaced apart from one another a distance sufficient to provide a transverse inner component of force as part of the resulting force at the end of the bending cycle.

FIG. 10 illustrates an alternate use for the embodiment depicted in FIGS. 8 and 9 for shaping the sheet to a relatively shallow curvature. The front cables 51a and 51b may be suspended at their upper ends from the upper front cross member 22 at any support points whose transversely outermost points of suspension for the ends of the cables are within the intersections of the tangent lines of the bent sheet with the line of apertures 25 in the upper front cross member 22.

Should one desire to develop a longitudinal sag as well as a transverse shape to the sheet, the sheet may be retained within the furnace for an additional period sufficient to impart the desired longitudinal sag. The front shaping member 70 and the rear shaping member 80 retain the longitudinal ends of the shaped sheet to their desired transverse configurations. Simultaneously, the unsupported portion of the shaped sheet intermediate its engaged end portions is free to sag. This freedom to sag enables the sheet to develop a longitudinally extending sag.

While several specific embodiments have been described, it is understood that certain modifications thereof are incorporated in this invention. For example, cable means depicted in FIGS. 6 and 7 may be used in association with one end of a sheet to be shaped while cable means such as that depicted in FIGS. 8 and 9 may be used in association with the other end of the sheet to be shaped. It is also contemplated that each clamp 41 may be suspended by a single cable connected to the clamping means intermediate its edge and suspended from an overhead beam or similar structure located intermediate the front beam and the rear beam of the carriage 20. Furthermore, each clamp 41 may be connected at a plurality of spaced points to a support cable or one of the clamps may be supported in one of the aforesaid methods and the other clamp may be supported in the same or a different one of said methods.

Gravity is depicted as the force by which the shaping members 70 and 80 apply a downward force onto the sheet to be shaped. It is understood that mechanical force may be applied to either or both shaping members to either augment or reduce the force of gravity to develop a downward force through the shaping members as required to develop the requisite shape in the end portion of the sheet to be shaped.

The present invention has been described in terms of shaping monolithic sheets of glass or plastic. It should be understood that laminates of two or more sheets of dissimilar materials may be bent to shape as well, using the principles of the present invention. Hence, the term "sheet" as used in the claims following this specification should be interpreted as incorporating laminated as well as monolithic sheets.

The embodiments previously described comprise clamps 41 that are rigid and straight. However, it is also contemplated that the clamps 41 may be composed of short, curved segments hinged to one another in end-to-end relation and capable of being unhinged for clamping by C-clamps 46 along the opposite longitudinal side edges of the sheet to be shaped. When the sheet S softens, the hinged segments move downward until they abut one another to form a pair of continuous, curved clamps of a shape conforming to the longitudinal contour desired for the opposite longitudinal side edges of the sheet.

The front and rear vertical guide posts 34 and 35 are removable to facilitate removal of the shaping frame comprising the shaping members 70 and 80 and their interconnecting structure for replacement by a vacuum mold in case further shaping of the sheet is desired after the cable hang forming operation. The cranks 56 and 60 may be rotated to raise or lower the shaped sheet as needed to help remove or install the shaping frame within the carriage. Also, the cable means 51, 52 or 51a, 51B, 52a, 52b may be mounted from different apertures 25 than used during the bending operation to temporarily distort and support the shaped sheet in a temporarily distorted shape to facilitate removal of the shaping frame and introduction of other shaping apparatus if needed.

The methods just described may comprise the entire method of shaping heat-softenable sheets to a desired complicated curvature. However, the shaping methods just described may be just one step of a multiple step operation used in combination with steps incorporating other types of shaping methods, such as pressure forming, press bending, vacuum forming and other well known shaping operations to develop a complicated shape.

The form of the invention shown and described in this disclosure represents an illustrative preferred embodiment and certain modifications thereof. It is understood that various changes may be made without departing from the gist of the invention as defined in the claimed subject matter which follows:

I claim:

1. A method of shaping a sheet of heat-softened material comprising clamping a pair of opposite side edges of said sheet between a pair of clamping elements, suspending said clamps from suspended cable means, supporting said sheet so that its opposite end portions are clamped against a pair of shaping members of curved configuration defining the cross-sectional shape desired for the opposite end portions of said sheet, heating said sheet to its deformation temperature to heat-soften said sheet, applying force against said sheet through said shaping members, thereby causing said suspended cable means to move closer to one another, and moving said clamps into closer spacing to one another to wrap said opposite end portions of said heat-softened sheet around said shaping members to shape said sheet end portions to their desired shape.

2. The method as in claim 1, wherein said cable means suspend said clamps at their longitudinal end portions.

3. The method as in claim 1 or claim 2, wherein said sheet is shaped to define a cross-sectional configuration including more than 180 degrees of arc at at least one of the end portions of the sheet, wherein the step of wrapping said end portion around a shaping member comprises wrapping said end portion about a shaping member of ring-like configuration defining more than 180 degrees of arc.

4. The method as in claim 3, wherein both of said opposite end portions of the sheet are shaped to define cross-sectional configurations including more than 180 degrees of arc comprising wrapping both of said end portions about shaping members of ring-like configuration defining more than 180 degrees of arc.

5. The method as in claim 1 or claim 2, wherein said sheet is composed of glass.

6. The method as in claim 5, wherein said sheet is shaped to define a cross-sectional configuration including more than 180 degrees of arc at at least one of the end portions of the sheet wherein the step of wrapping said end portion around a shaping member comprises wrapping said end portion about a shaping member of ring-like configuration defining more than 180 degrees of arc.

7. The method as in claim 5, wherein both of said opposite end portions of the sheet are shaped to define cross-sectional configurations including more than 180 degrees of arc comprising wrapping both of said end portions about shaping members of ring-like configuration defining more than 180 degrees of arc.

8. The method as in claim 1 or claim 2, wherein said sheet is composed of a transparent plastic selected from the group consisting of polycarbonates, acrylic plastics, polyesters and polyurethanes.

9. The method as in claim 8, wherein said sheet is shaped to define a cross-sectional configuration including more than 180 degrees of arc at at least one of the end portions of the sheet, wherein the step of wrapping said end portion around a shaping member comprises wrapping said end portion about a shaping member of ring-like configuration defining more than 180 degrees of arc.

10. The method as in claim 8, wherein both of said opposite end portions of the sheet are shaped to define cross-sectional configurations including more than 180 degrees of arc comprising wrapping both of said end portions about shaping members of ring-like configuration defining more than 180 degrees of arc.

11. The method as in claim 1 or claim 2, including clamping one of said end portions of said sheet to a shaping member of one configuration and the other of said end portions of said sheet to a shaping member of a different configuration, thereby shaping said opposite end portions to different configurations.

12. The method as in claim 11, wherein said sheet is composed of glass.

13. The method as in claim 11, wherein said sheet is composed of a transparent plastic selected from the group consisting of polycarbonates, acrylic plastics, polyesters and polyurethanes.

14. The method as in claim 11, wherein said sheet is shaped to define a cross-sectional configuration including more than 180 degrees of arc at at least one of the end portions of the sheet, wherein the step of wrapping said end portion around a shaping member comprises wrapping said end portion about a shaping member of ring-like configuration defining more than 180 degrees of arc.

15. The method as in claim 11, wherein both of said opposite end portions of the sheet are shaped to define cross-sectional configurations including more than 180 degrees of arc comprising wrapping both of said end portions about shaping members of ring-like configuration defining more than 180 degrees of arc.

16. The method as in claim 1 or claim 2, further including continuing to heat said sheet until it sags a desired amount about an axis transverse to a line extending between said shaping members.

17. The method as in claim 16, including clamping one of said end portions of said sheet to a shaping member of one configuration and the other of said end portions of said sheet to a shaping member of a different configuration, thereby shaping said opposite end portions to different configurations.

18. The method as in claim 16, wherein said sheet is composed of glass.

19. The method as in claim 16, wherein said sheet is composed of a transparent plastic selected from the group consisting of polycarbonates, acrylic plastics, polyesters and polyurethanes.

20. The method as in claim 16, wherein said sheet is shaped to define a cross-sectional configuration including more than 180 degrees of arc at at least one of the end portions of the sheet, wherein the step of wrapping said end portion around a shaping member comprises wrapping said end portion about a shaping member of ring-like configuration defining more than 180 degrees of arc.

21. The method as in claim 16, wherein both of said opposite end portions of the sheet are shaped to define cross-sectional configurations including more than 180 degrees of arc comprising wrapping both of said end portions about shaping members of ring-like configuration defining more than 180 degrees of arc.

22. The method as in claim 1 or 2, wherein said sheet originally clamped is a blank of larger extent than that of the shaped sheet and said sheet is trimmed to a desired outline from said blank after said shaping is completed.

23. The method as in claim 22, further including continuing to heat said sheet until it sags a desired amount about an axis transverse to a line extending between said shaping members.

24. The method as in claim 22, including clamping one of said end portions of said sheet to a shaping member of one configuration and the other of said end portions of said sheet to a shaping member of a different configuration, thereby shaping said opposite end portions to different configurations.

25. The method as in claim 22, wherein said sheet is composed of glass.

26. The method as in claim 22, wherein said sheet is composed of a transparent plastic selected from the group consisting of polycarbonates, acrylic plastics, polyesters and polyurethanes.

27. The method as in claim 22, wherein said sheet is shaped to define a cross-sectional configuration including more than 180 degrees of arc at at least one of the end portions of the sheet, wherein the step of wrapping said end portion around a shaping member comprises wrapping said end portion about a shaping member of ring-like configuration defining more than 180 degrees of arc.

28. The method as claim 22, wherein both of said opposite end portions of the sheet are shaped to define cross-sectional configurations including more than 180 degrees of arc comprising wrapping both of said end portions about shaping members of ring-like configuration defining more than 180 degrees of arc.

29. The method as in claim 1 or claim 2, wherein said applied force is gravity.

30. The method as in claim 29, wherein said sheet originally clamped is a blank of larger extent than that of the shaped sheet and said sheet is trimmed to a desired outline from said blank after said shaping is completed.

31. The method as in claim 29, further including continuing to heat said sheet until it sags a desired amount about an axis transverse to a line extending between said shaping members.

32. The method as in claim 29, including clamping one of said end portions of said sheet to a shaping member of one configuration and the other of said end portions of said sheet to a shaping member of a different configuration, thereby shaping said opposite end portions to different configurations.

33. The method as in claim 29, wherein said sheet is composed of glass.

34. The method as in claim 29, wherein said sheet is composed of a transparent plastic selected from the group consisting of polycarbonates, acrylic plastics, polyesters and polyurethanes.

35. The method as in claim 29, wherein said sheet is shaped to define a cross-sectional configuration including more than 180 degrees of arc at at least one of the end portions of the sheet, wherein the step of wrapping said end portion around a shaping member comprises wrapping said end portion about a shaping member of ring-like configuration defining more than 180 degrees of arc.

36. The method as in claim 29, wherein both of said opposite end portions of the sheet are shaped to define cross-sectional configurations including more than 180 degrees of arc comprising wrapping both of said end portions about shaping members of ring-like configuration defining more than 180 degrees of arc.

37. Apparatus for shaping a heat-softened sheet to a complicated curvatures comprising:
a carriage,
a pair of clamps for clamping each of the opposite side edges of said sheet,
first cable means suspending one of said pairs of clamps and another cable means suspending the other of said pairs of clamps,
means to support said cable means at one of their ends to said carriage,
a sheet shaping member having a configuration conforming to that desired at one of said opposite end portions of said sheet,
a sheet shaping member having a configuration conforming to that desired at the other of said opposite end portions of said sheet, and
means to clamp said shaping members to said sheet in such a manner that said shaping members rest in fixed relation to the upper surface of said sheet,
whereby when said sheet is heated to its deformation temperature, said shaping members follow said heated sheet in response to said sheet sagging as it softens and said cable means apply force through said clamps to said sheet to wrap said end portions about said shaping members associated with the respective end portions of said sheet to conform said clamped end portions to said shaping members.

38. Apparatus as in claim 37, wherein a pulley is rotatably supported at each end of each of said clamps to provide a pair of spaced pulleys associated with each of the opposite end portions of said sheet, and a cable or cable portion for suspending each of said pulleys from said carriage.

39. Apparatus for shaping heat-softened sheets to complicated curvatures comprising:
a carriage,
a pair of clamps for clamping each of the opposite side edges of said sheet,
cable means comprising a cable or a cable portion for each corner portio of an end portion of said sheet to be shaped, said cable means being suspended from an overhead point on said carriage and connected to one or another of said corner portions of said sheet,
a shaping member having a configuration conforming to that desired at one of the opposite end portions of said sheet,
a shaping member having a configuration conforming to that desired at the other of the opposite end portions of said sheet, and
means to clamp said shaping members to said end portions of said sheet in such a manner that said shaping member rests in fixed relation to the upper surface of said sheet,
whereby when said sheet is heated to its deformation temperature, said shaping members follow said heated sheet in response to said sheet sagging as it softens and said cable means apply force to said sheet to wrap said end portions about said shaping members associated with said end portions to conform said clamped end portions to said shaping members.

40. Apparatus as in claim 13, wherein said shaping members are interconnected to form a shaping frame.

41. Apparatus as in claim 38 or 39, further including means to guide said means to clamp said shaping members to said end portions for vertical movement in response to the heat sagging of said sheet.

42. Apparatus as in claim 41, wherein said shaping members are interconnected to form a shaping frame.

43. Apparatus as in claim 38 or claim 39 wherein said shaping members have different configurations.

44. Apparatus as in claim 43, wherein said shaping members are interconnected to form a shaping frame.

45. Apparatus for shaping a heat-softened sheet to a complicated curvatures comprising:
a carriage,
a pair of clamps for clamping each of the opposite side edges of said sheet,
a pulley rotatably supported to each end of each of said clamps to provide a pair of spaced pulleys associated with each of the opposite ends of said sheet,
a first cable entrained about said pair of spaced pulleys associated with one of said opposite ends of said sheet,
a second cable entrained about said other pair of spaced pulleys associated with other of said opposite ends of said sheet,
a sheet shaping member having a configuration conforming to that desired at one of said opposite end portions of said sheet, and
means to clamp said sheet shaping members to the opposite ends of said sheet,
whereby when said sheet is heated to its deformation temperature said shaping members follow said heated sheet in response to said sheet sagging as it softens and said cables apply force through said clamps to said sheet to wrap said ends about said shaping members to conform said clamped ends to said shaping members.

46. Apparatus as in claim 45, wherein said shaping members are interconnected to form a shaping frame.

47. Apparatus as in claim 45, further including means to guide said means to clamp said shaping members to said ends for vertical movement in response to heat sagging of said sheet.

48. Apparatus as in claim 47, wherein said shaping members are interconnected to form a shaping frame.

49. Apparatus as in claim 45 or claim 47, wherein said shaping members have different configurations.

50. Apparatus as in claim 49, wherein said shaping members are interconnected to form a shaping frame.

* * * * *